Patented Nov. 23, 1926.

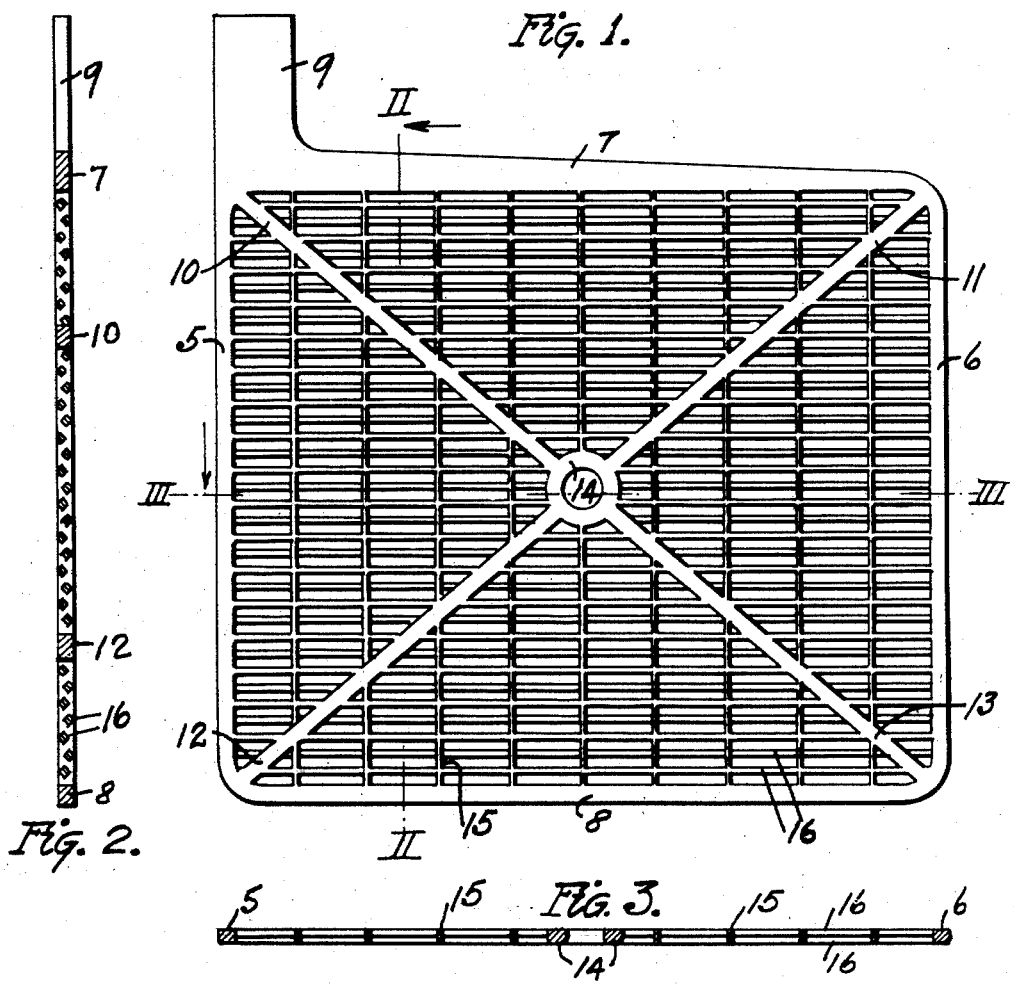

1,608,469

UNITED STATES PATENT OFFICE.

WALTER H. DANIEL, OF MEMPHIS, TENNESSEE, ASSIGNOR TO WILLIAM M. COX, OF MEMPHIS, TENNESSEE.

STORAGE-BATTERY PLATE.

Application filed March 19, 1926. Serial No. 95,895.

This invention has general reference to plates for storage batteries, whether of the Planté or the pasted type, but relates more particularly to such plates which are intended to have the active material applied thereto by some mechanical process, instead of its being formed by chemical or electrochemical action, as in Planté batteries.

The principal objects of the present invention are to improve upon the storage-battery plates known heretofore, by providing such a plate in which—

(a) A greater amount of the active material may be applied to the plate than has been possible with those previously devised, in proportion to the size and weight or mass of the plate;

(b) The shape and arrangement of the grill members is such that there is minimum tendency for the active material to become dislodged from the plate;

(c) The grill members are so arranged and connected that breakage or other defectiveness of several thereof will have little deleterious effect upon the efficiency of the plate;

(d) The plate is strengthened and stiffened by an arrangement of grill members comprising a large number of thin flat ribs and substantially square ribs, which meet at right-angles, and others of greater cross-sectional area placed diagonally thereof; and (e) Special provision is made for expansion and contraction of said diagonal members, without likelihood of distortion or breakage thereof, or of the marginal framework members or the small ribs.

The means by which the foregoing and other objects are accomplished by my invention, and the manner of their accomplishment, readily will be understood from the following description on reference to the accompanying drawings, in which—

Fig. 1 is a side elevation of a preferred form of plate embodying my invention.

Fig. 2 is a section taken substantially on line II—II of Fig. 1.

Fig. 3 is a section taken substantially on line III—III of Fig. 1.

Fig. 4 is a fragmentary detail view of an alternate form of my improved plate, showing a different manner of joining the diagonal members at the centre of the plate.

Referring now to the drawings in detail, the framework of the plate comprises sides 5 and 6 and ends 7 and 8, of unitary construction, having curved portions at three of the corners, and having at the fourth corner a supporting lug 9, the end 7 gradually increasing in width from its end nearest side 6 to its junction with said lug. Extending from the curved corners of the rectangular framework, are diagonal members 10, 11, 12 and 13, one end of each of which is connected with one of said corners, while its other end is unitary with an annular portion 14 which joins the four diagonals at the centre of the plate.

A series of narrow ribs 15 are arranged parallel with the sides 5 and 6 of the framework, being spaced symmetrically, of substantially the same depth as the side members 5 and 6 and the end members 7 and 8, and being secured to said end members and to the respective ones of the diagonal members 10, 11, 12 and 13. Another series of ribs 16 are arranged parallel with the end members 7 and 8, preferably being substantially square in cross-section, being secured to said end members and to the respective ones of said diagonal members, with their respective faces at angles of 45° to the plane of the face of the plate, and being "staggered", as indicated in Fig. 2, so that the two sides of the plate have a plurality of V-shaped grooves, the respective ones of which are interupted by the ribs 15 and by the diagonal members.

In the alternate form of the plate shown in Fig. 4, the four diagonals 17, 18, 19 and 20 are not directly connected at the centre of the plate, but members 17 and 19 are joined by a curved portion 21, and members 18 and 20 by a similar curved portion 22, said curved portions being spaced a sufficient distance apart at the centre of the plate to provide for any expected expansion of the diagonal members. As is the case in the form of plate shown in Figs. 1 to 3, the diagonals shown in Fig. 4 are connected with both ribs 15 and ribs 16.

From the foregoing description, it will be seen that the diagonal members 10, 11, 12 and 13 (or 17, 18, 19 and 20), not only serve to strengthen and stiffen the whole plate, but also, by decreasing the unsupported length of the smaller ribs 15 and 16, the presence of said diagonals lessens the likelihood of initial defects in the manufacture of the plate, and that of breakage of said ribs by handling, while the paste is being applied, or after being placed in the battery. But still another function of said diagonals is to increase the number of current leads from the ribs 15 and 16 to the lug 9, and thereby to increase the rapidity of current output, and to decrease the probability of current interruptions where breakages of said ribs occur. Thus, a breakage of one or more of the ribs 15 or 16 in one of the triangular spaces between two diagonals and a side or end member of the framework, would do little harm, on account of there being three conductors (the two diagonals and the side or end member), through one or more of which the current from the broken rib or ribs would be delivered to the lug 9.

Various modifications of minor details of my improved storage-battery plate doubtless readily will suggest themselves to those skilled in this art, and I therefore do not desire to have my invention limited to the exact forms of construction or arrangements of parts that are shown and described herein.

Having now fully disclosed the invention, what is claimed is:

1. A battery-plate, comprising side and end members of substantially the same thickness, constituting a unitary, rectangular, skeleton frame, having solid members of substantially the same thickness and cross-sectional area and configuration as said side and end members, connecting the diagonally-opposite corners of said frame and autogenously joined thereto; a series of ribs, uniformly spaced apart throughout the span between the side members, connecting said diagonals with said end frame members; and a series of ribs at right-angles to said first-named ribs, and connecting them with said diagonals and with said side frame members, said rectangular ribs being arranged with all of their side faces at acute angles to the face of the battery-plate.

2. A battery-plate, comprising side and end members of substantially the same thickness, constituting a unitary, rectangular, skeleton frame, having solid members of substantially the same thickness and cross-sectional area and configuration as said side and end members, connecting the diagonally-opposite corners of said frame and autogenously joined thereto; a series of uniformly-spaced ribs of substantially the same depth as said diagonals, connecting them with opposite sides of said frame; and a series of uniformly-spaced rectangular ribs of less depth than said first-named ribs, arranged in staggered relation at right-angles thereto with all of their side faces at acute angles to the face of the battery-plate, and connecting said first-named ribs with said diagonals and with the other two opposite sides of said frame.

3. A battery-plate, comprising side and end members of substantially the same thickness, constituting a unitary, rectangular, skeleton frame; solid members of substantially the same width and thickness and cross-sectional area and configuration as said frame members, connecting the diagonally-opposite corners of said frame; thin, flat ribs, uniformly spaced apart, connecting said diagonals with said end frame members; and rectangular ribs of less depth than said flat ribs, uniformly spaced apart in staggered relation at right-angles to said flat ribs, and connecting them with said diagonals and with said side frame members, solid rectangular ribs being arranged with all of their side faces at acute angles to the face of the battery-plate, said plate having an expansion opening which is limited to the centre thereof.

4. A battery-plate, comprising side and end members of substantially the same cross-sectional area, constituting a unitary, rectangular, skeleton frame, having solid members of substantially the same cross-sectional area and configuration as said frame members, connecting the diagonally-opposite corners of said frame; a series of symmetrically-arranged, thin, flat ribs of less cross-sectional area than said diagonals, connecting them with said end frame members; and a series of symmetrically-arranged, square ribs of substantially the same cross-sectional area as said flat ribs, disposed at right-angles thereto with all of their side faces at acute angles to the face of the battery-plate, and connecting said flat ribs with said diagonals and with said side frame members.

In testimony of the foregoing, I affix my signature.

WALTER H. DANIEL.